Nov. 26, 1935.   J. L. HEROLD ET AL   2,022,201
APPARATUS FOR CLEANING BOTTLES
Filed Sept. 19, 1932   2 Sheets-Sheet 1
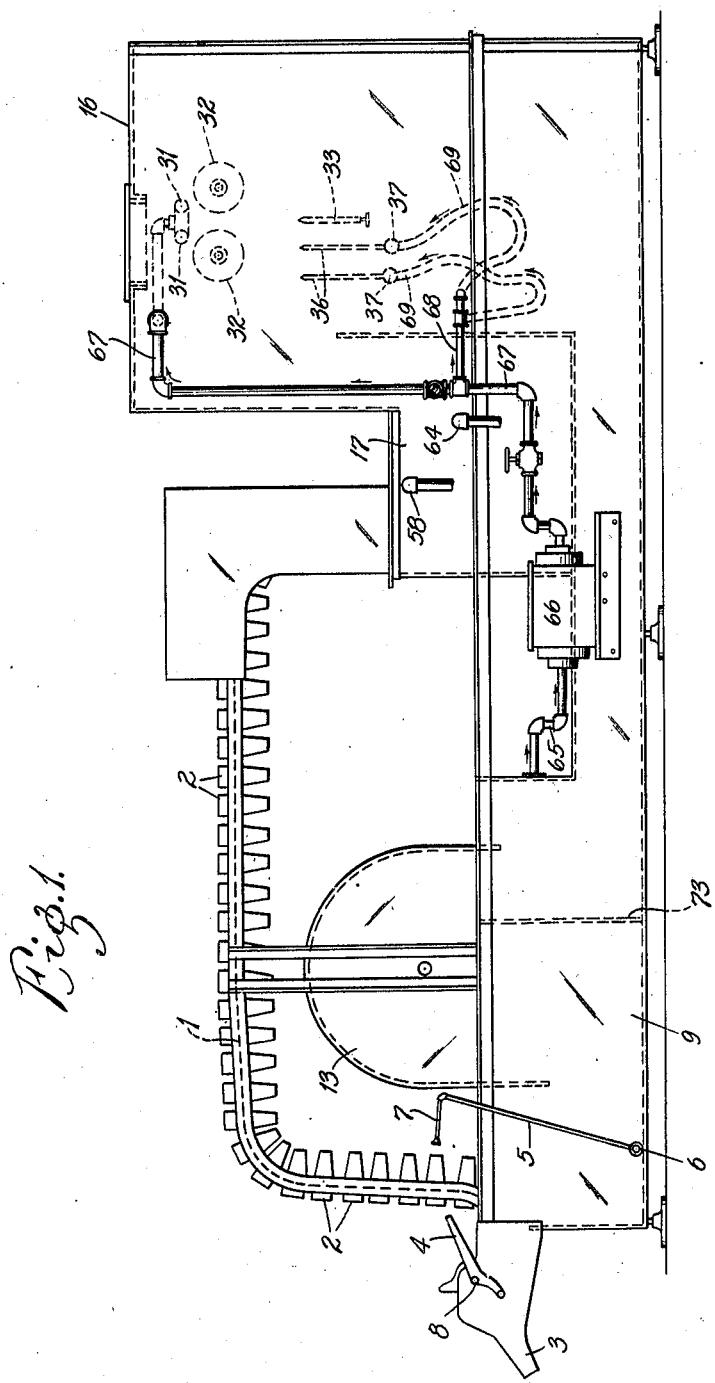
INVENTORS:
J. L. HEROLD,
J. W. DAWSON.
By Albert J. McCauley
ATTORNEY.

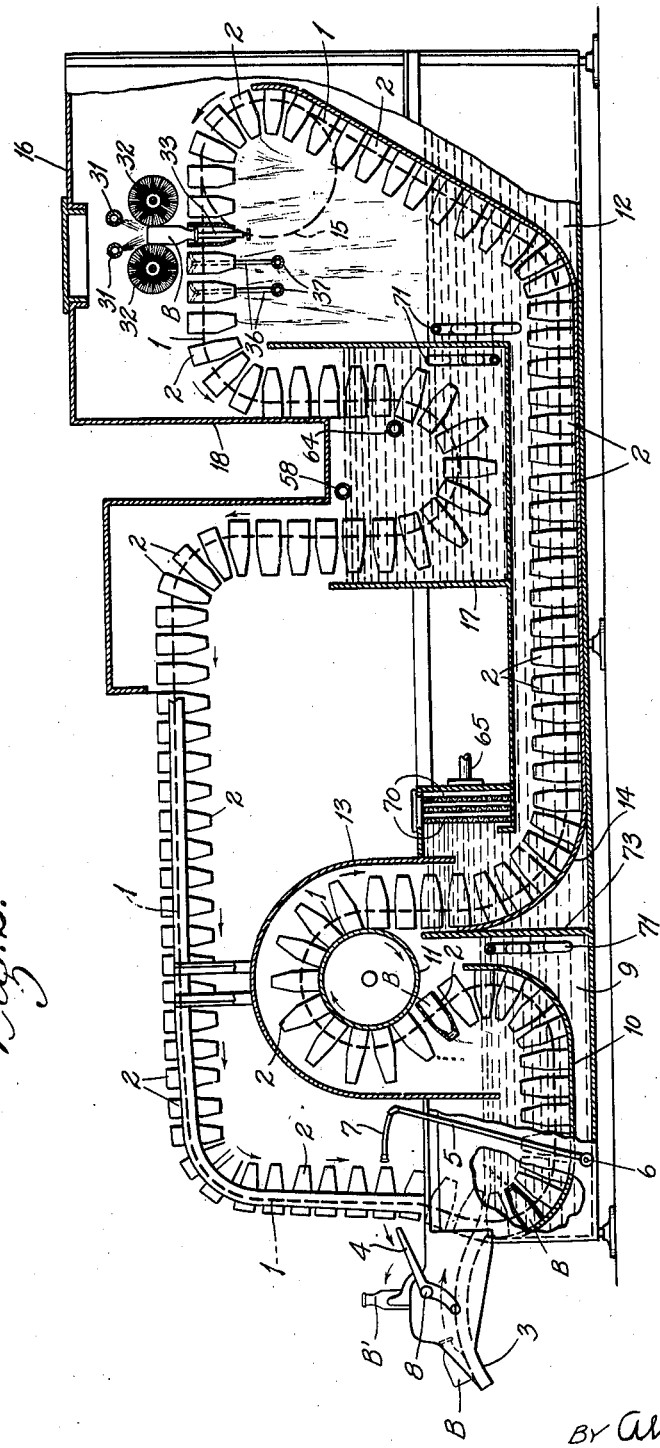

Patented Nov. 26, 1935

2,022,201

UNITED STATES PATENT OFFICE 2,022,201

APPARATUS FOR CLEANING BOTTLES

James L. Herold and Joseph W. Dawson, St. Louis, Mo., assignors to Barry-Wehmiller Machinery Company, St. Louis, Mo., a corporation of Missouri Application September 19, 1932, Serial No. 633,717

2 Claims. (Cl. 141—7)

This invention relates to an apparatus for cleaning bottles, wherein the bottles are transmitted through a cleansing compartment in which a chemical solution is agitated on the surfaces of the bottles, and thence through a rinsing compartment to remove the chemical solution from the bottles.

Bottles can be given a very effective cleansing operation by agitating a chemical solution, such as a caustic solution on the surfaces of the bottles. For example, this solution may be forcibly sprayed and brushed, or otherwise agitated on the surfaces of the bottles. However, such agitation of the chemical solution results in the production of large volumes of soapy foam, and this involves a problem which has not been recognized, or not overcome, prior to the present invention.

Heretofore, we have subjected the bottles to the desired forcible cleansing action of a hot caustic solution in a sealed chamber, and while this proved a theoretical advantage, it led to the production of soapy foam which was not properly removed when the bottles were transmitted through a body of relatively fresh rinsing water beyond the sealed chamber. This soapy foam clings to the bottles and bottle carrier, and when confined by a liquid seal it will float on the surface of the liquid and soon overflow into the sealed compartment.

Moreover, the bottles and bottle-carrier, moving downwardly into the liquid seal, carry a large percentage of the soapy foam into the lower portion of the rinsing water, and this has produced a soapy mixture lacking the rinsing property of relatively fresh water.

An object of this invention, therefore, is to provide an apparatus wherein the foam, produced by the agitation of the chemical solution on the bottles, is removed in a simple and effective manner.

Fig. 1 is a side elevation of an apparatus embodying the features of this invention.

Fig. 2 is a longitudinal section of the same, with some of the parts shown diagrammatically.

To illustrate one form of the invention, we have shown an apparatus comprising an elongated housing provided with an endless bottle-carrier including endless chains 1, shown diagrammatically in Figures 1 and 2, and bottle holders 2 caried by said chains. It is to be understood that any suitable power mechanism (not shown) may be employed to impart an intermittent movement to the bottle-carrier, so that the bottles will move step by step, as is usual in this art, and that any suitable supports may be employed to guide the bottle-carrier in the endless course herein shown. We have omitted some of the structural details as they are not necessary to an understanding of the invention.

The bottles B enter the front end of the machine by passing over a curved guide 3 at the left of Fig. 2, and afer making a complete circuit through all of the stations, the bottles are discharged at the same end of the machine by passing onto an inclined guide 4, which lies immediately above the guide 3, as shown in Fig. 2.

The bottles may be forcibly discharged onto said guide 4 by means of an arm 5, pivotally supported at 6, and having an extension 7 adapted to enter the bottle holders to discharge the bottles therefrom. The guide 4 is pivoted at 8, so it can be shifted to move the bottles to the upright position shown at B' in Fig. 2.

The endless bottle-carrier travels in the direction indicated by arrows in Fig. 2. It moves downwardly from the inlet guide 3 and passes through a preliminary soaking compartment 9, preferably containing relatively fresh water wherein the bottles are submerged as they travel over a stationary plate 10 which confines the bottles in the bottle holders.

The bottle-carrier moves upwardly from the compartment 9, passes around a rotary member 11, and thence downwardly into the liquid in an intermediate soaking compartment 12. A closed hood 13 (Fig. 2) extends from the liquid in the preliminary compartment 9 to the liquid in the intermediate compartment 12, the lower ends of said hood 13 being extended into the respective liquids to form liquid seals, whereby vapor is confined in the hood. Therefore, as the bottles slowly travel from one of said liquids to the other, they are "soaked" in a body of warm vapor which extends from one body of liquid to the other. The bottles then travel slowly through the elongated soaking compartment 12 which preferably contains a chemical solution, such as caustic soda, wherein the bottles are submerged. At this time, the bottles are confined in the holders by means of a plate 14. They travel approximately from end to end of this long compartment 12 and then rise at the rear portion of the apparatus, where the bottle-carrier is guided upwardly in an inclined course and then turned over a rotary device 15 (Fig. 2) to discharge the liquid contents of the bottles onto the bottles in said inclined course, thereby producing a shower which aids in cleaning the rising bottles. It will be noted that the bottles are inverted as the bottle-carrier passes over the rotary device 15.

The inverted bottles then begin their return movement at a high elevation, and in a horizontal course, above the liquid in the compartment 12.

A hood 16 at the rear of the machine extends from the liquid in the soaking compartment 12 to a point above the liquid in a rinsing compartment 17.

While the bottles are in the upper portion of the hood 16, they may be acted upon by streams of liquid and brushes to forcibly cleanse the inner and outer faces of the bottles in a manner which will be hereafter described. At this time the bottles are inverted, so the washing liquid, preferably a chemical solution, will drain into the compartment 12, instead of passing into the compartment 17.

The compartment 17 contains relatively fresh water, and the bottle-carrier passes downwardly into this liquid at one side of a wall 18, and then upwardly from the surface of the liquid at the opposite side of said compartment. The wall 18 is separated from the liquid so that the surface of the liquid is unobstructed from the point where the bottle-carrier and the bottles enter the liquid to the overflow 58. Foam carried by the bottles and the bottle-carrier will be deposited on the surface of this liquid and, as will be hereafter described, carried thereon to the overflow.

The bottle-carrier moves upwardly from the liquid in the compartment 17 and then turns to the left as indicated by arrows in Fig. 2, as it starts on a long horizontal course toward the front of the machine.

The inverted bottles are then drained and dried as they travel to the front of the machine where the carrier moves downwardly to the discharge device 7 which pushes the bottles from the holders and onto the guide 4, as previously described.

We will now refer to the washing operations which occur in the upper portion of the hood 16 (Fig. 2) when the bottles are inverted in passing from the soaking compartment 12 to the rinsing compartment 17.

A pair of horizontal pipes 31 is located above the course of the bottle-carrier and these pipes have ports to discharge streams of liquid onto the bottles. A pair of horizontal brushes 32 is located below the pipes 31 so that the liquid from the pipes 31 may be thoroughly agitated on the outer surfaces of the bottles. The brushes 32 are shown diagrammatically, as the present invention is not limited to any details of a brushing device. The means for raising and lowering the bottles between the brushes 32 comprises a spindle device 33 adapted to occupy the elevated position shown in Fig. 2. Any suitable means (not shown) may be employed to raise and lower the spindle 33.

After leaving this cleansing station, the bottles pass to an adjacent station where their inner faces are forcibly cleansed by streams of liquid. In performing this operation we preferably employ vertical spindles 36 carried by horizontal pipes 37 which may be raised and lowered by any suitable mechanism (not shown). The spindles 36 are in the form of tubes through which streams of liquid are forcibly discharged onto the inner faces of the bottles.

The bodies of liquid in the several compartments 9, 12 and 17 may be heated in any suitable manner, and as a diagrammatical illustration of this feature, we have shown a steam coil 71 in each of said compartments.

The liquid discharged by the tubes 31 and spindles 36 is preferably obtained from the hot chemical solution in the compartment 12. A pipe 65 (Fig. 1) leads from the forward end portion of compartment 12 to a pump 66 having a discharge pipe 67 leading to the pair of pipes 31. Strainers 70 are located in the course of the solution flowing to the pipe 65, as shown in Fig. 2. A branch 68, extending from the pipe 67 leads to flexible tubes 69 (Fig. 1) and these tubes are connected to the pipes 37.

The caustic solution in the compartment 12 will, therefore, be forcibly sprayed and brushed on the surfaces of the bottles. The caustic solution applied in this manner produces a very effective cleansing action which could not be obtained by mere soaking alone. However, the severe agitation of the caustic solution produces large volumes of foam which will be deposited on the bottles and bottle carrier, and carried into the rinsing compartment 17.

This soapy foam will float on the surface of the liquid in the rinsing compartment 17, and if no provision is made for its removal, or if the partition 18 were extended into the liquid in the compartment 17, the soapy foam would soon collect and back up into the compartment 12.

To prevent such a condition, we provide for an immediate separation of the foam from the bottles and bottle carrier as they enter into the rinsing water in the compartment 17. This foam floats on the surface of the rinsing water and it is more or less forcibly circulated to the overflow pipe 58. To provide for this circulation, the rinsing compartment 17 may be provided with a fresh water supply pipe 64 which leads into said compartment at a point adjacent to the descending portion of the bottle carrier.

The incoming fresh water will cause a constant circulation of the water in the compartment 17 from the inlet pipe 64 to the overflow pipe 58 which is spaced from the inlet pipe 64 and the position where the bottles enter said rinsing compartment, and since the compartment 17 is unobstructed at the surface of the water, the soapy foam will be freely circulated on the surface of the water from the bottle carrier to the overflow 58. It is, therefore, possible to obtain a highly efficient cleansing action by agitating a caustic solution on the bottles without causing an undesirable accumulation of soapy foam in any part of the system.

The transmission of floating foam from the bottle carrier to the overflow 58 may be accelerated by locating a heating coil 71 at the right side of the rinsing compartment 17 (Fig. 2), so as to create a thermic circulation which causes the liquid to rise at the incoming portion of the bottle carrier, and then flow horizontally to the overflow pipe 58.

By removing the foam as herein disclosed, the fresh rinsing water is maintained in the relatively clean condition necessary to effectively remove the other foreign matter from the bottles.

We claim:

1. In a bottle cleaning apparatus wherein the bottles are subjected to the action of a hot caustic solution in a cleansing compartment, a rinsing compartment at one side of said cleansing compartment, said rinsing compartment being provided with an overflow and an inlet from which water is circulated to said overflow, a bottle carrier traveling through said cleansing compartment and thence through said rinsing compartment, said inlet being located near the position where the bottle carrier enters said rinsing compartment, and a partition over which the carrier passes and then moves downwardly from said cleansing compartment to said rinsing compartment, said overflow being spaced from said inlet and the position where the bottles enter said rinsing compartment, and the surface of the water from said partition to said overflow being unobstructed to permit free transmission of the soapy foam from said bottle carrier to said overflow.

2. In a bottle cleansing apparatus wherein the bottles are transmitted through a cleansing compartment containing a foam-forming solution, a rinsing compartment, and a bottle carrier for transmitting the bottles from the cleansing compartment through said rinsing compartment, said rinsing compartment being provided with an overflow and an inlet from which water is circulated to said overflow, said overflow being spaced from said inlet and the position where the bottles enter said rinsing compartment, said inlet being located near the position where the bottles and bottle carrier enter said rinsing compartment so as to provide for the transmission of the foam from said bottles and bottle carrier to said overflow, and the surface of the water from said overflow to said inlet being unobstructed to permit free transmission of the foam from said inlet to said overflow.

JAS. L. HEROLD.
JOS. W. DAWSON.